United States Patent
Dürrer et al.

(10) Patent No.: US 7,581,758 B2
(45) Date of Patent: Sep. 1, 2009

(54) GUIDE LOOP ELEMENT FOR SEAT BELTS WITH ONE-PIECE CASTING PART

(75) Inventors: Michael Dürrer, Neumünster (DE); Hans-Jörg Cord, Norderstedt (DE)

(73) Assignee: Autoliv Development AB, Vargarda (SE)

( * ) Notice: Subject to any disclaimer, the term of this patent is extended or adjusted under 35 U.S.C. 154(b) by 161 days.

(21) Appl. No.: 10/560,036

(22) PCT Filed: Aug. 4, 2004

(86) PCT No.: PCT/EP2004/008704

§ 371 (c)(1),
(2), (4) Date: Oct. 23, 2006

(87) PCT Pub. No.: WO2005/021338

PCT Pub. Date: Mar. 10, 2005

(65) Prior Publication Data

US 2007/0114776 A1    May 24, 2007

(30) Foreign Application Priority Data

Aug. 26, 2003 (DE) .............................. 103 39 562

(51) Int. Cl.
*B60R 21/24* (2006.01)

(52) U.S. Cl. .................................... 280/808; 280/801.1

(58) Field of Classification Search .................. 280/808, 280/801.1, 801.2; 297/483, 482; *B60R 21/24*
See application file for complete search history.

(56) References Cited

U.S. PATENT DOCUMENTS

| 5,601,311 | A  | * | 2/1997 | Pfeiffer et al. | ............ | 280/801.1 |
| 6,168,206 | B1 | * | 1/2001 | Greib et al. | .................. | 280/808 |
| 6,702,327 | B2 | * | 3/2004 | Janz | ............................ | 280/808 |
| 6,929,286 | B2 | * | 8/2005 | Bertelle et al. | .............. | 280/808 |
| 7,192,057 | B2 | * | 3/2007 | Moendel et al. | ............. | 280/808 |

FOREIGN PATENT DOCUMENTS

| DE | 202 05 570 | | 8/2002 |
| EP | 0 174 129 A2 | * | 3/1985 |
| EP | 0 174 126 A | | 3/1986 |
| EP | 0 318 222 A | | 5/1989 |
| GB | 1 280 153 A | | 7/1972 |
| JP | 2001-138862 | | 3/2001 |

* cited by examiner

*Primary Examiner*—Ruth Ilan
(74) *Attorney, Agent, or Firm*—Brinks Hofer Gilson & Lione

(57) ABSTRACT

A guide loop for a seat belt in motor vehicles, comprising a one-piece metal body a cladding part and a displacement body. The metal body includes a fixing eye and a belt guidance slit and a rounded running surface. The a cladding part is made of plastic and held onto the metal body, and the displacement body limits the slit height of the belt guidance slit, through which webbing of the seat belt runs. The cladding part is formed as a one piece body with edge areas that at least partially enclose the metal body is firmly secured to the metal body by means of tension applied by the edge areas onto the metal body.

9 Claims, 4 Drawing Sheets

GUIDE LOOP ELEMENT FOR SEAT BELTS WITH ONE-PIECE CASTING PART

CROSS REFERENCE TO RELATED APPLICATIONS

This application claims priority to German patent application DE10339562.8, filed Aug. 26, 2003 and PCT/EP2004/008704, filed Aug. 4, 2004.

FIELD OF THE INVENTION

The present invention relates to a guide loop for a seat belt in a motor vehicle.

BACKGROUND OF THE INVENTION

A guide loop is described in U.S. Pat. No. 4,861,070. A cladding part, in the form of a cap is placed on the body of the redirecting element. It includes, at its top end a wall section which extends over a shoulder formed on the top end of the body and holds the cladding part on the body by means of an interference or form fit. Opposite the wall section a bar is located on the cladding part, that is pushed into a slit of the body next to the belt guide slit. A disadvantage of this known redirecting element is that the interference or form fit between the wall section and shoulder requires precision processing of the parts, and the location of the bar makes providing any additional slits near the belt guide slit difficult.

A guide loop is also described in DE 202 05 570 U1. In order to cover a metal body, which carries the belt load and is anchored to the vehicle, a cladding part is provided so that no metal areas can be seen. In the embodiment described in DE 202 05 570 U, the cladding consists of two side parts manufactured of plastic, which are each pushed onto the metal body from the side and are held together at the point where they contact one another by connectors. In addition, a displacement body which covers an area of the metal body designed to receive a fixing eye is also coupled to the metal body. This guide loop has the disadvantage that the two separate parts needed to form the cladding part are manufactured and mounted separately, and the mounting operation requires additional connectors with the displacement body. As above, this requires precise manufacturing to maintain the fit, not only of the individual components of the cladding part, but also of the metal body so that the connectors fit when the redirecting element is mounted to, for example, a vehicle pillar.

The present invention is based on the need to simplify the manufacture and mounting of a guide loop and reducing the parts count while still providing the characteristics described above.

SUMMARY OF THE INVENTION

The present invention provides a guide loop having a metal body, a cladding part and a displacement body. The cladding part includes portions made of a flexible material, such as plastic, capable of being deformed and fitted over a metal body. In an assembled condition, the cladding part can be firmly placed on the metal body by means of tension within the cladding part applied to edges of the metal body.

The invention is based on the concept of forming the cladding part as a unified, one-piece component which can be positioned on the flat side of the metal body. The cladding part can be coupled to the metal body in only one assembly step, and is dimensioned in such a way that in the assembled state its edge areas clamp the edges of the metal body and secure the cladding part to the metal body. Tension within the cladding part is created by bending open the cladding part which is manufactured of plastic and therefore is capable of deforming, so that during assembly it can be fitted over the metal body. This has the advantage that only one manufacturing step is needed for the cladding part and only one assembly step is needed to couple it to the metal body.

Retension of the cladding part can be improved if clip-type holders are formed in the cladding part for retaining the cladding part on the metal body; in this context it can be useful if at least a part of the edges of the cladding part include a clip type holder.

Another embodiment of the invention forms the metal body in a way known from DE 202 05 570 U1 with a lower bar including an outwardly directed, open C-shaped cross section. The bar forms a running surface for the belt strap, and in this embodiment of the invention the cladding part includes a groove to accept an outer wall of the C-shaped cross section lower part to enclose the lower bar of the metal body.

According to yet another embodiment of the invention, the metal body includes at the upper edge of the belt guidance slit, near the fixing eye, an edge angled several times and forming a tab projecting centrally into the belt guidance slit. A limiting edge running at an angle of approximately 45 degrees to the longitudinal axis of the belt guidance slit is matched by a corresponding contour of the displacement body and covers the part of the metal body which accommodates the fixing eye and tab. This has the advantage, in contrast to the known metal body, of providing more material between the limiting edges and the fixing eye, which improves the strength of the metal body.

Also, in a known manner, the displacement body includes projections which extend into the fixing eye of the metal body to accept a fixing means. The displacement body also includes lobes in its upper area which enclose the fixing eye and extend beyond the contour of the metal body, as a means to limit the rotational path of the redirecting element around the fixing means when the guide loop is secured to the motor vehicle.

To simplify mounting the guide loop, another embodiment of the invention may provide a cladding part including a division formed by a slit in the area which surrounds the fixing eye. This division makes it easier to bend open the cladding part during fitting of the cladding part over the metal body. In this embodiment, the displacement body is a separate component clipped to the metal body, for which purpose corresponding clip holders can be provided.

In a further embodiment of the invention the displacement body is formed as a single piece with the cladding part. In this case the cladding part is a closed component preferably fixed to the metal body by means of included clip holders. This connection allows an alternative manufacturing process, wherein the cladding part and the displacement body are formed in an injection molding process, facilitating a one-piece displacement body and cladding part.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

Embodiments of the invention are shown in the drawings described below.

DETAILED DESCRIPTION OF THE INVENTION

Figure 1:
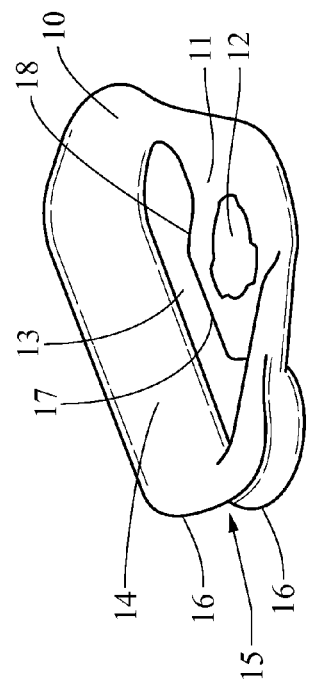
FIG. 1 is a top, front perspective view of a metal body of a guide loop according to the present invention.

In FIG. 1, a metal body 10 of a guide loop for use with a seat belt in a motor vehicle is shown in fundamental agreement with the state of the art according to DE 202 05 570 U1. More particularly, the metal body 10, for example, manufactured of steel plate by means of cold forming, includes an upper area 11 having a fixing eye 12 through which a fixing means (not shown), may pass to affix the metal body 10 to a vehicle pillar. The metal body 10 expands from the upper area 11 into an area in which a belt guidance slit 13 is formed by walls 16 having a C profile 15 and separated by a distance from one another. A lower bar 14 of the metal body 10 is formed by the C profile 15 and includes a rounded running surface for a webbing of the seat belt (not shown) which is guided by belt guidance slit 13. The top of the belt guidance slit 13, formed near the fixing eye 12, includes edges 18 which are angled several times forming a tab 17 which projects centrally into the belt guidance slit 13. The edges 18 run at an angle of approximately 45 degrees to the longitudinal axis of the belt guide slit 13, increasing the area of material between the edges 18 and the fixing eye 12, improving the strength of the metal body 10.

Figure 2:
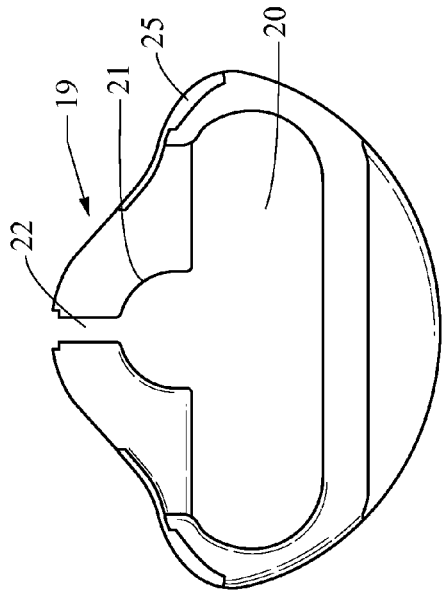
FIG. 2 is a first embodiment of a cladding part of the guide loop in a front view according to the present invention.
Figure 3:
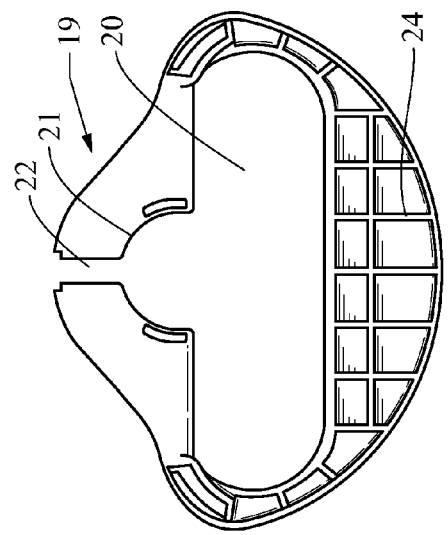
FIG. 3 is the embodiment of FIG. 2 in a rear view.
Figure 4:
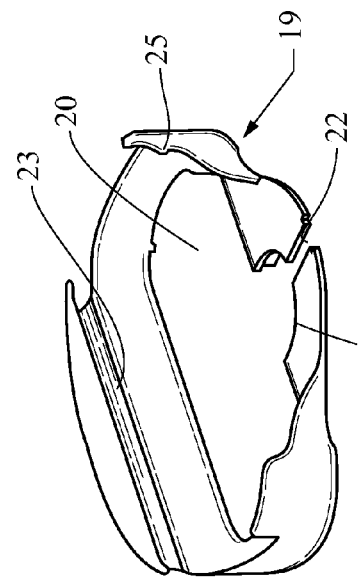
FIG. 4 is a top, front perspective view of the embodiment of FIG. 2.

FIGS. 2 to 4, illustrate a first embodiment of a unified, single piece cladding part 19 of the guide loop for use in conjunction with the metal body 10. The cladding part 19 is shaped to substantially match the contour of the metal body 10 in such a way that it is secured to the metal body 10 solely by tension present in the cladding part 19. A central opening 20 allows space for the belt guidance slit 13 and the tab 17 of the metal body 10.

Looking more closely, the cladding part 19 includes in its top area quarter-circular shaped limitations 21 to partially enclose the fixing eye 12 of the metal body 10. The limitations 21 are divided by a slit 22, to create a flexible portion of the cladding part 19. In addition, part of its outer perimeter, the cladding part 19 includes edge areas 25 which enclose the outer contour of the metal body 10. In the lower area of the cladding part 19 a groove 23 is included to accommodate the wall 16 of the C-profile 15 of the lower bar 14 such that the lower part of the cladding part 19 is held onto the metal body 10 by means of an interference fit (see FIG. 4). The upper part of the cladding part 19 is secured to the metal body 10 by means of the tension exercised by the edge areas 25 crafted by flexing open the slit 22. FIG. 3 illustrates the back of the cladding part 19 which, in the example shown, is not formed with a smooth surface on the back (i.e. the side which cannot be seen when it is installed), but includes ribs 24 formed by gaps in the material for increased rigidity.

The present invention also includes a displacement body 26 of the guide loop, similar to that described in DE 202 05 570 U1. Various embodiments of the displacement body 26 are illustrated in FIGS. 5 to 7, either as a second component along with the one-piece cladding part 19 or as a single, integral component combined with the cladding part 19 shown in FIGS. 2 to 4.

Figure 5:
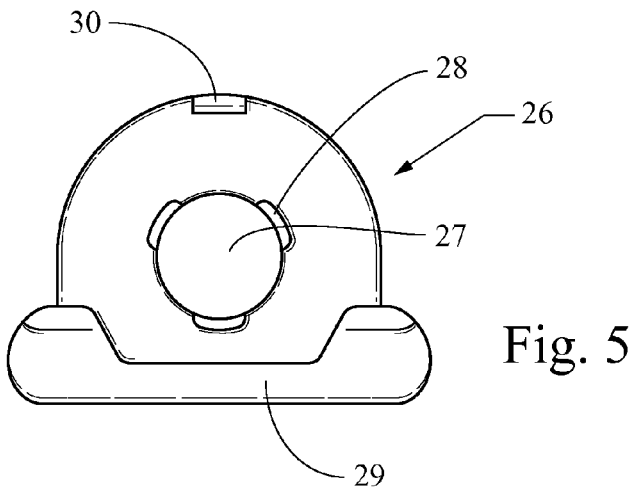
FIG. 5 is a front view of a displacement body of the guide loop according to the present invention.
Figure 6:
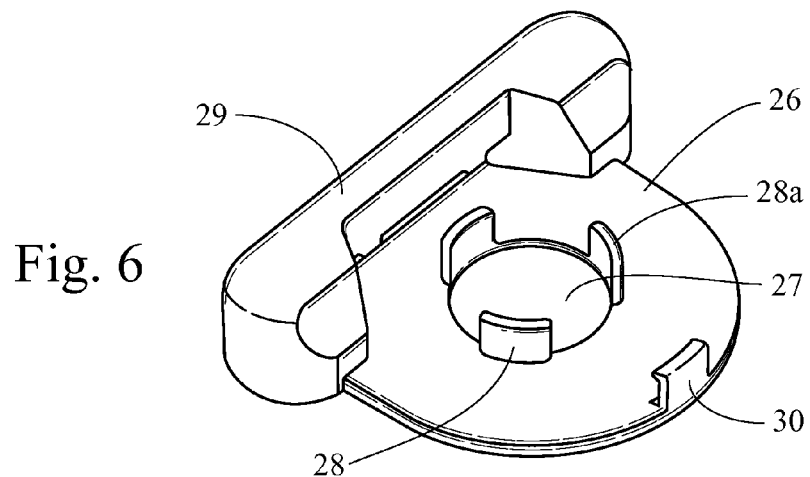
FIG. 6 is the displacement body of FIG. 5 in a top, front perspective view.
Figure 7:
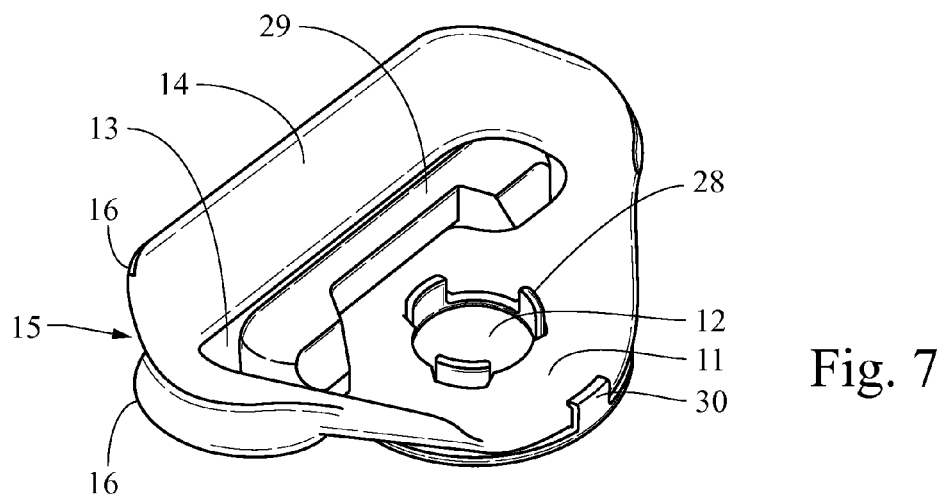
FIG. 7 is the displacement body of FIG. 6 mounted to the metal body of FIG. 1, in a top, front perspective view.

Turning specifically to FIGS. 5 and 6, the displacement body 26 is provided to cover the upper area 11 of the metal body 10. An eye 27, and a plurality of projections 28, are provided. The eye 27 aligns with, and the projections 28 extend into, the fixing eye 12. When the fixing means (not shown) of the redirecting element is fixed to the vehicle, the projections 28 prevent the fixing means (not shown) from contacting the inner circumference of the fixing eye 12 of the metal body 10.

The displacement body 26 also includes a limiting bridge 29 which extends around the tab 17 of the metal body 10 and into the belt guide slit 13. This limits, the overall operating height of the belt guide slit 13 by the thickness of the limiting bridge 29. In order to secure the displacement body 26 firmly onto the metal body 10, a clip projection 30 is formed in the top edge of the displacement body 26 (see FIG. 6). In addition, the projections 28 may also be provided with clip hooks 28a, to further secure and position the displacement body 26 onto the metal body 10 as shown in FIG. 7.

Figure 8:
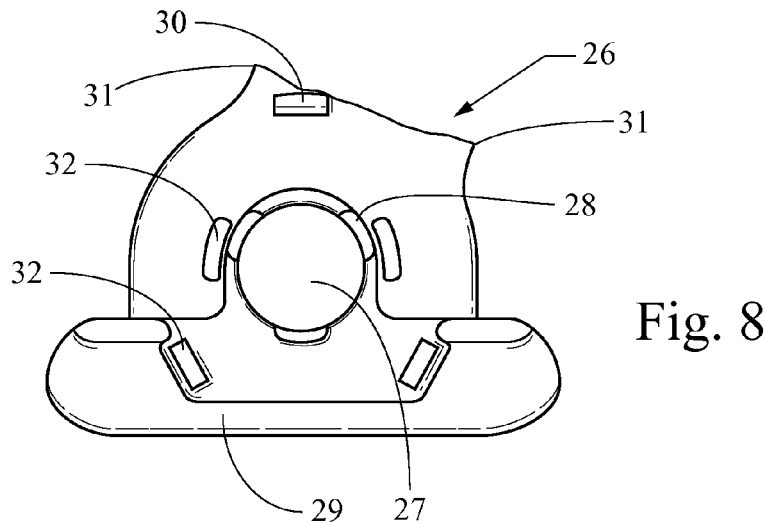
FIG. 8 is a front view of a second embodiment of the displacement body of FIG. 5.
Figure 9:
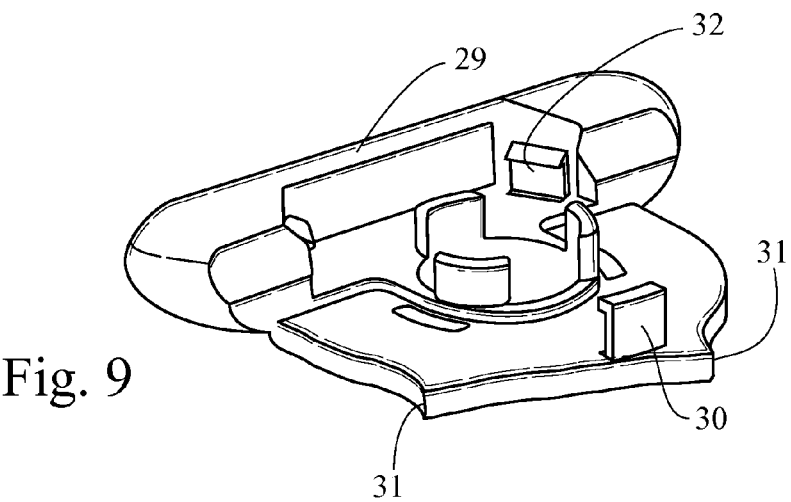
FIG. 9 is a top, front perspective view of the displacement body of FIG. 8.
Figure 10:
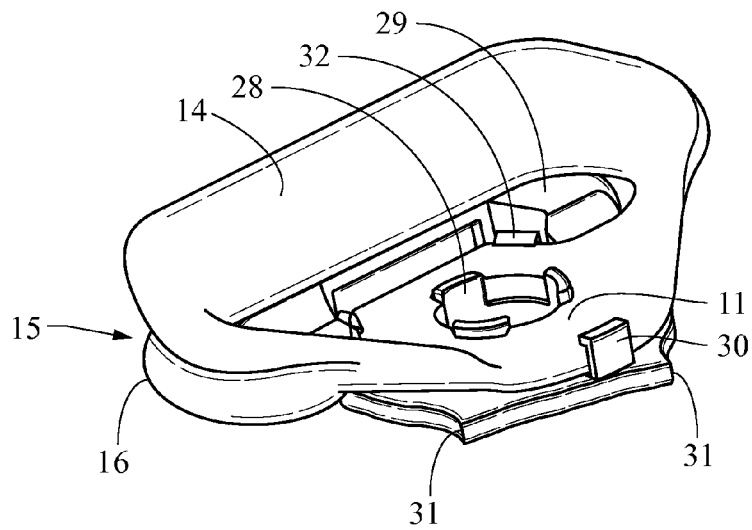
FIG. 10 is the displacement body of FIG. 9 mounted to the metal body of FIG. 1, in a top, front perspective view.

Another embodiment of the displacement body 26 is shown in FIGS. 8 to 10. It basically differs from the embodiment shown in FIGS. 5 to 7 in that the upper area which encloses the fixing eye 12 of the metal body 10 includes lobes 31. The lobes 31 project beyond the contour of the metal body 10 and serve to limit the amount of rotation of the guide loop about the fixing means (not shown) when the guide loop is installed in the vehicle. Furthermore, additional clip holders 32 are provided in the area of the limiting bridge 29 to secure the displacement body 26 to the limiting edges 18 of the metal body 10.

Figure 11:
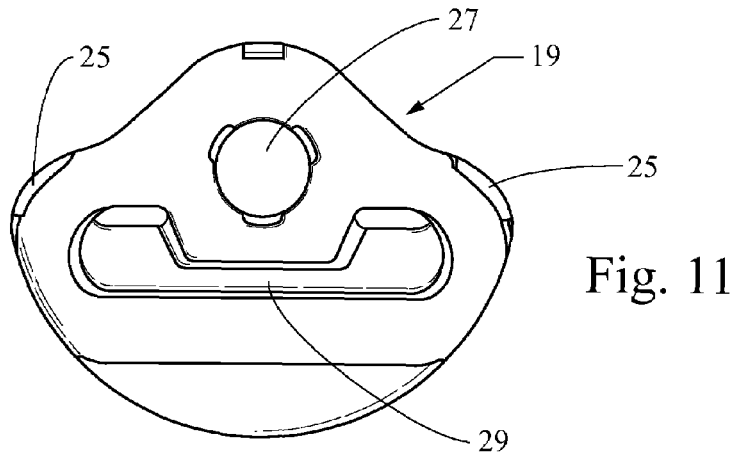
FIG. 11 is a front view of the cladding part and the displacement body formed as a single piece.
Figure 12:
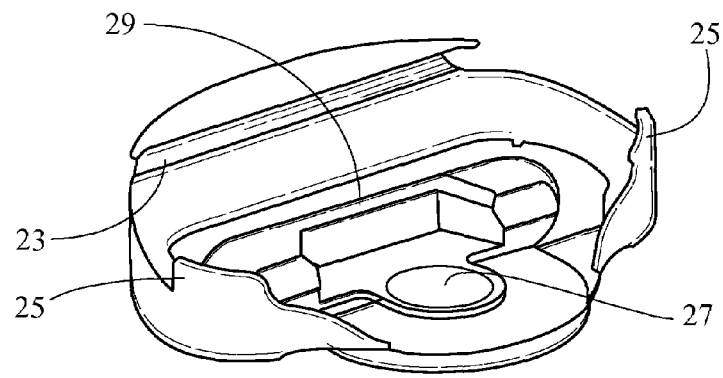
FIG. 12 is the cladding part and displacement body of FIG. 11 in a top, front perspective view.
Figure 13:
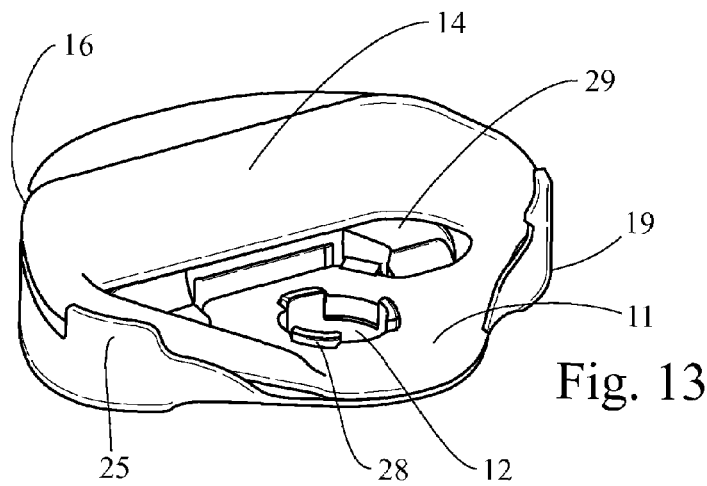
FIG. 13 is the guide loop of the present invention wherein the cladding part and the displacement body of FIG. 11 are mounted to the metal body of FIG. 1 shown in a top, front perspective view.

The embodiment shown in FIGS. 11 to 13, illustrates the cladding part 19 and the displacement body 26 formed as one piece, resulting in a unitary component which can be manufactured in a single process. FIG. 13 illustrates the unitary components of the embodiment assembled onto the metal body 10 of FIG. 1. Also note, in FIGS. 11 to 13, common numbers are used to denote common features with the embodiments of FIGS. 2 to 10. Such features function in a similar manner to their counterparts in the earlier embodiments. The. unitary component of this embodiment requires only one manufacturing step and one step assembling the unitary component onto the metal body 10 to form the guide loop of the present invention.

While the above description constitutes the preferred embodiment of the present invention, it will be appreciated that the invention is susceptible to modification, variation and change without departing from the proper scope and fair meaning of the accompanying drawings.

The invention claimed is:

1. A guide loop element for a seat belt in a motor vehicle comprising:
   a one-piece metal body with a fixing eye and a belt guidance slit provided with a rounded running surface and configured to accept a webbing of the seat belt,
   a cladding part coupled to the metal body, and
   a displacement body configured to couple with and limit the height of the guidance slit through which the webbing runs, wherein
   the cladding part is formed as a one-piece body at least partially formed of a flexible material such that edge areas arranged to at least partly enclose the metal body and configured to be bent open and fitted and fit over and enclose at least part of the metal body such that tension within the edge areas acts upon the metal body to secure the cladding part in position, the metal body includes a lower bar forming a running surface and having a C-shaped cross-section open to the outside, and the cladding part includes a groove configured to accept an outer wall of the C-shaped cross section in the portion of the cladding part coupled to the lower bar of the metal body.

2. A guide loop according to claim 1, wherein clip holders are included on the cladding part to secure the cladding part to the metal body.

3. A guide loop according to claim 2, wherein at least a portion of the edge areas enclosing the metal body include clip holders.

4. A guide loop according to claim 1, wherein an upper edge of the belt guidance slit includes a course that is angled several times to form a tab which projects centrally into the belt guidance slit and has at least one limiting edge running at an angle of approximately 45 degrees relative to the longitudinal axis of the belt guidance slit, and the displacement body includes a contour correspondingly-shaped to cover an area around the fixing eye and accept the tab.

5. A guide loop according to claim 4, wherein the displacement body includes projections which project into the fixing eye of the metal body and are configured to accept a fixing means.

6. A guide loop according to claim 5, wherein the displacement body in its upper area enclosing the fixing eye includes lobes which project beyond the contour of the metal body to limit the rotation around the fixing means of the guide loop when installed into the motor vehicle.

7. A guide loop according to claim 1, wherein the cladding part in the area surrounding the fixing eye includes a division formed by a slot.

8. A guide loop according to claim 1, wherein the displacement body includes clip holders arranged to couple the displacement body to the metal body.

9. A guide loop according to claim 1, wherein the displacement body is formed as one piece with the cladding part.

* * * * *

UNITED STATES PATENT AND TRADEMARK OFFICE
CERTIFICATE OF CORRECTION

PATENT NO. : 7,581,758 B2 Page 1 of 1
APPLICATION NO. : 10/560036
DATED : September 1, 2009
INVENTOR(S) : Michael Dürrer and Hans-Jörg Cord It is certified that error appears in the above-identified patent and that said Letters Patent is hereby corrected as shown below:

On the title page, item (57),

In the Abstract, line 9, after "body" insert --and--.

Signed and Sealed this

Tenth Day of November, 2009

David J. Kappos
*Director of the United States Patent and Trademark Office*